(12) United States Patent
Matsuoka

(10) Patent No.: US 12,328,085 B2
(45) Date of Patent: Jun. 10, 2025

(54) ELECTRONIC CONTROL DEVICE

(71) Applicant: HITACHI ASTEMO, LTD., Hitachinaka (JP)

(72) Inventor: Atsushi Matsuoka, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 134 days.

(21) Appl. No.: 18/044,485

(22) PCT Filed: Sep. 10, 2021

(86) PCT No.: PCT/JP2021/033308
§ 371 (c)(1),
(2) Date: Mar. 8, 2023

(87) PCT Pub. No.: WO2022/059615
PCT Pub. Date: Mar. 24, 2022

(65) Prior Publication Data
US 2023/0327598 A1    Oct. 12, 2023

(30) Foreign Application Priority Data

Sep. 17, 2020    (JP) ................ 2020-156738

(51) Int. Cl.
*H02P 29/02* (2016.01)
*B62D 5/04* (2006.01)
*H02P 25/22* (2006.01)

(52) U.S. Cl.
CPC ............. *H02P 29/02* (2013.01); *H02P 25/22* (2013.01); *B62D 5/046* (2013.01)

(58) Field of Classification Search
CPC ........ H02P 29/02; H02P 25/22; H02P 29/028; H02P 29/68; B62D 5/046; B62D 5/0481; B62D 5/0496
USPC .................. 318/400.22, 400.21, 400.01, 700
See application file for complete search history.

(56) References Cited

U.S. PATENT DOCUMENTS

| | | | |
|---|---|---|---|
| 7,948,205 B2 * | 5/2011 | Gunji | H02P 29/0241 361/23 |
| 9,124,207 B2 * | 9/2015 | Hayashi | B62D 5/0403 |
| 10,864,937 B2 * | 12/2020 | Yamamoto | H02P 29/028 |
| 10,994,769 B2 * | 5/2021 | Koseki | B62D 5/0403 |

(Continued)

FOREIGN PATENT DOCUMENTS

JP    2019-187134 A    10/2019

OTHER PUBLICATIONS

International Search Report dated Oct. 26, 2021 issued in International Application No. PCT/JP2021/033308, with English translation, 5 pages.

(Continued)

*Primary Examiner* — David Luo
(74) *Attorney, Agent, or Firm* — FOLEY & LARDNER LLP

(57) ABSTRACT

Even when generation of resistance value increase abnormality is detected in one of GND harnesses of two systems, current restriction is not immediately executed on the abnormal system but the start of current restriction is delayed within a range in which a rise in temperature of a low heat resistance component in an ECU does not exceed a limit in terms of the heat resistance performance and/or the durability performance.

10 Claims, 8 Drawing Sheets

(56) References Cited

U.S. PATENT DOCUMENTS

2021/0046973 A1 2/2021 Koseki et al.

OTHER PUBLICATIONS

International Preliminary Report on Patentability and Written Opinion dated Mar. 21, 2023 issued in PCT Application No. PCT/JP2021/033308, with English translation, 12 pages.

* cited by examiner

ELECTRONIC CONTROL DEVICE

TECHNICAL FIELD

The present invention relates to an electronic control device performing energization control independently for each system in an in-vehicle apparatus redundantly configured with a plurality of systems.

BACKGROUND ART

In a known electronic control device (ECU), energization control is performed independently for each system in an in-vehicle apparatus redundantly configured with a plurality of systems, whereby, when abnormality is generated in a part of the systems, energization control for the abnormal system is restricted to continue the energization control in the normal systems. As disclosed in, for example, Patent Document 1, there is known an EPS (Electric Power Steering) apparatus which is provided with two systems performing energization control for each winding set with respect to a motor having two independent winding sets. In this EPS apparatus, in the case of a failure in one system, the energization control is continued by the other system, whereby the assistance of the steering force is prevented from being stopped.

Such an electronic control device is provided with a control system ground that is common to two systems in order to avoid relative fluctuation in the potential of the control system ground between the systems and an increase in cost due to adoption of a differential signal system as a solution thereof. Thus, when resistance value increase abnormality such as open failure is generated in the ground harness of one system, a current flows from one system to the other system via the control system ground, and an excessive amount of current is allowed to flow to the ground harness of the other system. In view of this, the current flowing through the control system ground is detected, and, based on this current, current restriction is executed for the motor when resistance value increase abnormality of the ground harness is detected.

REFERENCE DOCUMENT LIST

Patent Document

Patent Document 1: JP 2019-187134 A

SUMMARY OF THE INVENTION

Problem to be Solved by the Invention

In the case in which resistance value increase abnormality is generated in the ground harness of one system, it is to be assumed that, as compared with the temperature rise of the ground harness of the other system, the temperature rise of a component in the electronic control device due to the current flowing through the control system ground is more severe from the viewpoint of the heat resistance performance and/or the durability performance. Even on this assumption, it has been found out that the temperature rise of the component in the electronic control device does not immediately reach a limit value defined from the viewpoint of the heat resistance performance and/or the durability performance, but increases with the passage of time.

However, in the EPS apparatus mentioned above, current restriction is executed as abnormality processing as soon as resistance value increase abnormality of the ground harness is detected, so that a limitation to the apparatus function occurs irrespectively of whether or not it will take a time to reach a limit value in the temperature rise of the component in the electronic control device.

In view of the problem mentioned above, it is accordingly an object of the present invention to provide an electronic control device in which, in an in-vehicle apparatus redundantly configured with a plurality of systems, the time elapsed until the apparatus function of a system is restricted due to abnormality in a part of the systems is elongated as much as possible.

Means for Solving the Problem

According to the present invention, there is provided an electronic control device including: a first positive electrode connector and a first negative electrode connector connected to a first power source; a second positive electrode connector and a second negative electrode connector connected to a second power source; a first inverter connected to the first positive electrode connector and the first negative electrode connector and energizing a first winding set of an electric motor to drive the first winding set of the electric motor; a second inverter connected to the second positive electrode connector and the second negative electrode connector and energizing a second winding set of the electric motor to drive the second winding set of the electric motor; a ground portion connected to the first negative electrode connector and the second negative electrode connector; a sensor portion provided between the first negative electrode connector and the ground portion or between the second negative electrode connector and the ground portion; a current detection circuit capable of detecting a current flowing between the first negative electrode connector and the second negative electrode connector via the ground portion based on an output signal of the sensor portion; and a microcomputer having a first microcomputer connected to the first positive electrode connector and the first negative electrode connector and controlling an output of the first inverter, and a second microcomputer connected to the second positive electrode connector and the second negative electrode connector and controlling an output of the second inverter, the first microcomputer and the second microcomputer estimate a rise temperature inside the electronic control device based on an output voltage of the current detection circuit; and the first microcomputer starts restriction of a current output from the first inverter based on the rise temperature, or the second microcomputer starts restriction of a current output from the second inverter based on the rise temperature.

Effects of the Invention

In the electronic control device according to the present invention, in an in-vehicle apparatus redundantly configured with a plurality of systems, it is possible to prolong, as much as possible, the time elapsed until the apparatus function of a system is restricted due to abnormality in a part of the systems.

MODE FOR CARRYING OUT THE INVENTION

In the following, an embodiment for carrying out the present invention will be described in detail with reference to the attached drawings.

First Embodiment

Figure 1:
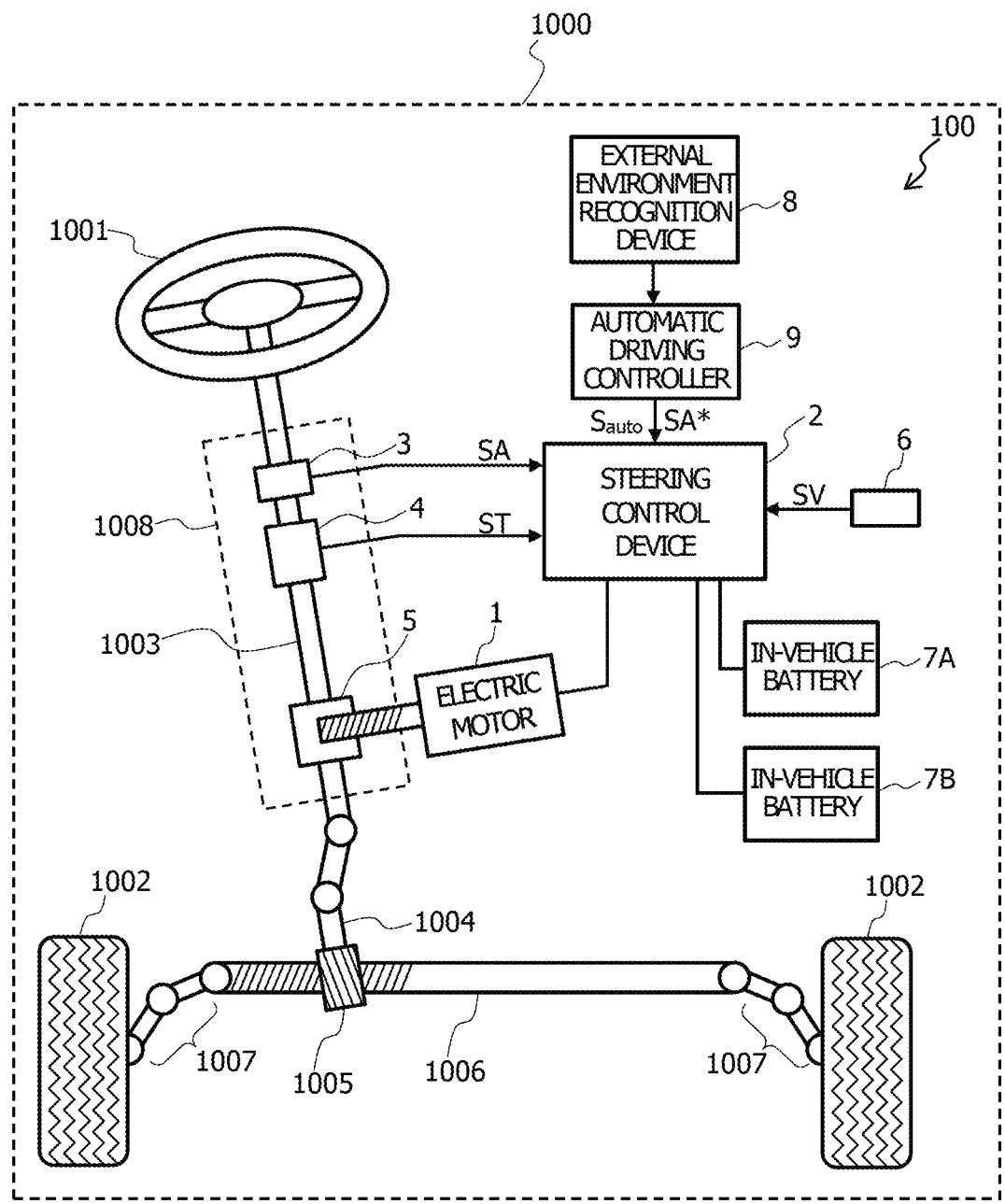
FIG. 1 is a schematic diagram illustrating an example of an electric steering apparatus.

FIG. 1 illustrates an example of an electric steering apparatus according to the first embodiment. In normal driving of a vehicle 1000 in which the driver performs steering operation, when a pair of steered wheels 1002 are to be steered by a steering torque generated by a steering wheel 1001, an electric steering apparatus 100 functions as power steering assisting the steering torque.

The steering torque generated through the operation of steering wheel 1001 is transmitted to a pinion shaft 1004 via a steering shaft 1003, etc., and then transmitted to a pinion gear 1005 connected to a pinion shaft 1004. The rotational movement of pinion gear 1005 due to the steering torque transmitted is converted to a linear movement in the vehicle width direction by a rack gear 1006 in mesh with pinion gear 1005, and a pair of steering mechanisms 1007 connected to rack gear 1006 are operated by this linear movement. As a result, steered wheels 1002 respectively connected to the pair of steering mechanisms 1007 are steered; in power steering, an assist torque assisting the steering torque is added to the transmission route of the steering torque to the pair of steering mechanisms 1007.

In the example shown, electric steering apparatus 100 includes a motor 1, and an electric steering control device (hereinafter simply referred to as "ECU") 2 which contains a computer and which performs driving control on motor 1. Furthermore, electric steering apparatus 100 includes, in a steering column 1008 containing steering shaft 1003, a steering angle sensor 3, a steering torque sensor 4, and a reduction gear 5 transmitting the output of motor 1 in a decelerated state to steering shaft 1003.

ECU 2 inputs various signals such as a steering angle detection signal SA from steering angle sensor 3, a steering torque detection signal ST from steering torque sensor 4, and a vehicle speed detection signal SV from a vehicle speed sensor 6. Furthermore, ECU 2 calculates a target value (target torque) of the assist torque based on the steering angle, the steering torque, the vehicle speed, etc. obtained from the various signals input, and controls the rotational driving of motor 1 such that the torque generated by motor 1 approximates the target torque. In addition, the torque generated by motor 1 is transmitted to steering shaft 1003 via reduction gear 5, whereby the steering force is assisted with an assist torque in accordance with the operation state of vehicle 1000.

On the other hand, in automatic driving of vehicle 1000, electric steering apparatus 100 functions as an automatic steering device, and, in order to exert this function, further includes an external environment recognition device 8 and an automatic driving controller 9. External environment recognition device 8 is, for example, a camera, and gains external environment information, etc., for vehicle 1000. In the case in which automatic driving of vehicle 1000 is to be performed, automatic driving controller 9 outputs an automatic driving request signal $S_{auto}$. Furthermore, automatic driving controller 9 calculates the target steering angle of steering wheel 1001 based on the external environment information, etc., gained by external environment recognition device 8, and outputs a steering angle command signal SA* including target steering angle information. When it inputs automatic driving request signal $S_{auto}$, ECU 2 controls the rotational driving of motor 1 such that the current steering angle gained from steering angle detection signal SA appropriates the target steering angle gained from steering angle command signal SA*. The torque generated by motor 1 is transmitted to steering shaft 1003 via reduction gear 5, whereby the automatic driving of vehicle 1000 is performed.

Electric steering apparatus 100 is redundantly configured with two systems: an electrical system in which power is supplied to motor 1 via ECU 2 from a first in-vehicle battery (an external power source) 7A, and an electrical system in which power is supplied to motor 1 via ECU 2 from a second in-vehicle battery (an external power source) 7B. As a result, even in the case in which abnormality is generated in one electrical system, the power supply to motor 1 is continued in the other electrical system, making it possible to maintain the function of electric steering apparatus 100. In the following, in motor 1 and ECU 2, the electrical system in which power is supplied from first in-vehicle battery 7A will be referred to as the "first electrical system," and the letter "A" will be affixed to the reference numerals indicating the components of the first electrical system. Similarly, in motor 1 and ECU 2, the electrical system in which power is supplied from second in-vehicle battery 7B will be referred to as the "second electrical system," and the letter "B" will be affixed to the reference numerals indicating the components of the second electrical system.

Figure 2:
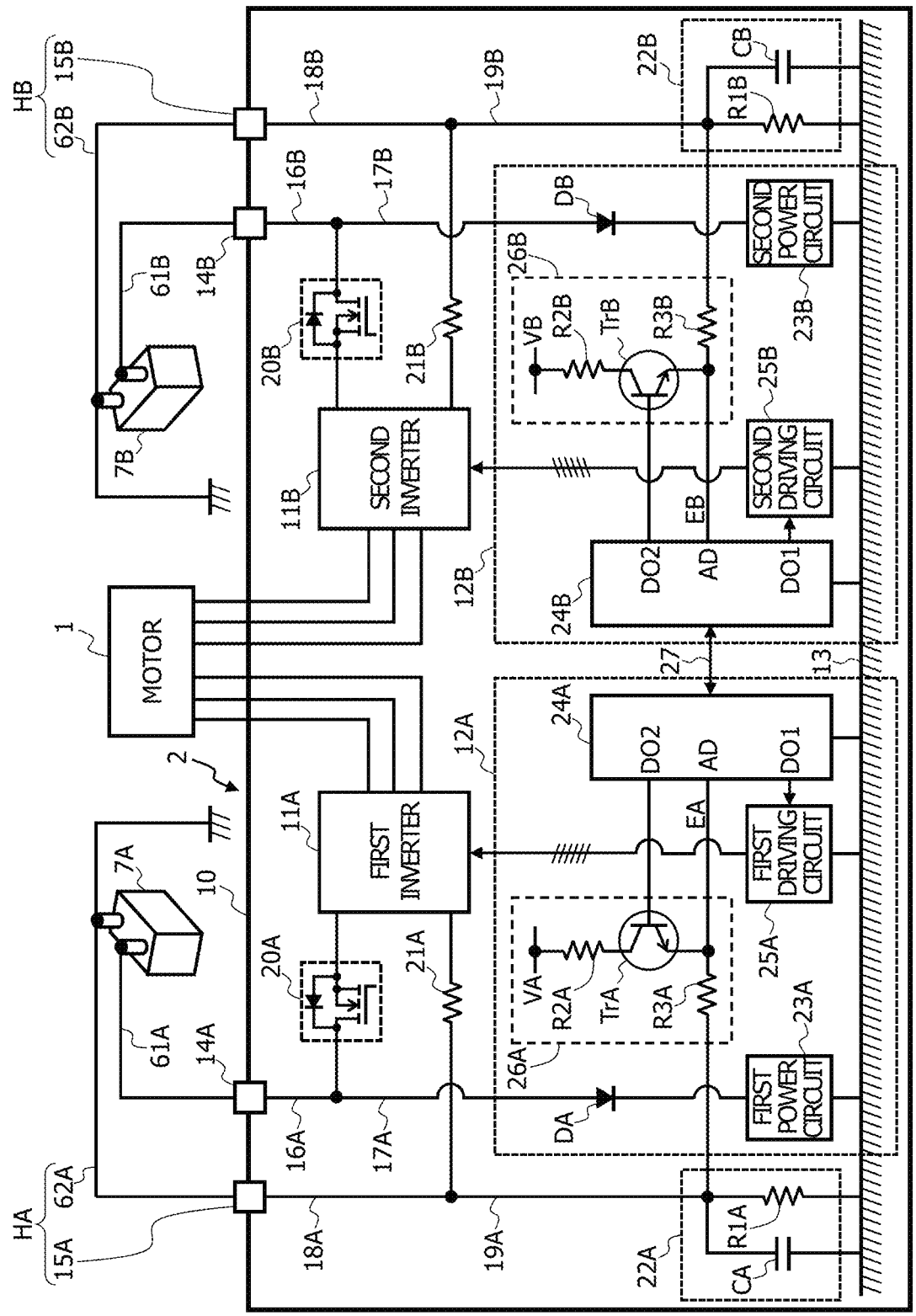
FIG. 2 is a circuit diagram illustrating an example of the internal construction of an ECU according to a first embodiment.

FIG. 2 illustrates an example of the internal structure of ECU 2 of electric steering apparatus 100. In FIG. 2 showing ECU 2, components which are used for the normal driving (non-automatic driving) of vehicle 1000 is extracted from ECU 2 of electric steering apparatus 100 in FIG. 1.

Inside a housing 10 of ECU 2, there are accommodated, as the first electrical system using first in-vehicle battery 7A as the power source, a first inverter 11A driving a first winding set (described below) of the windings of motor 1, and a first control circuit 12A controlling the output of first inverter 11A.

Furthermore, inside housing 10 of ECU 2, there are accommodated, as the second electrical system using second in-vehicle battery 7B as the power source, a second inverter 11B driving a second winding set (described below) of the windings of motor 1, and a second control circuit 12B controlling the output of second inverter 11B.

First control circuit 12A and second control circuit 12B share a control system common ground 13 within ECU 2.

As components electrically connecting the interior and the exterior of housing 10 of ECU 2, the first electrical system is provided with a first positive electrode connector 14A and a first negative electrode connector 15A, and the second electrical system is provided with a second positive electrode connector 14B and a second negative electrode connector 15B.

First positive electrode connector 14A is electrically connected to the positive electrode of first in-vehicle battery 7A via a first power source positive electrode line 61A, and first negative electrode connector 15A is electrically connected to the negative electrode of first in-vehicle battery 7A via a first power source negative electrode line 62A.

Second positive electrode connector 14B is electrically connected to the positive electrode of second in-vehicle battery 7B via a second power source positive electrode line 61B, and second negative electrode connector 15B is electrically connected to the negative electrode of second in-vehicle battery 7B via a second power source negative electrode line 62B.

The two negative electrodes of first in-vehicle battery 7A and second in-vehicle battery 7B are respectively electrically connected to the body earth of vehicle 1000. In the following, the structure formed by first negative electrode connector 15A and first power source negative electrode line 62A will be referred to as a first ground (GND) harness HA, and the structure formed by second negative electrode connector 15B and second power source negative electrode line 62B will be referred to as a second ground (GND) harness HB.

Within housing 10 of ECU 2, first positive electrode connector 14A is electrically connected to a positive bus line of first inverter 11A via first positive electrode line 16A. A first branching-off positive electrode line 17A branching off from first positive electrode line 16A is electrically connected to a power source circuit (described below) of first control circuit 12A. First branching-off positive electrode line 17A may branch off from first positive electrode line 16A within first positive electrode connector 14A.

Within housing 10 of ECU 2, second positive electrode connector 14B is electrically connected to a positive bus line of second inverter 11B via second positive electrode line 16B. A second branching-off positive electrode line 17B branching off from second positive electrode line 16B is electrically connected to a power source circuit (described below) of second control circuit 12B. Second branching-off positive electrode line 17B may branch off from second positive electrode line 16B within second positive electrode connector 14B.

Within housing 10 of ECU 2, first negative electrode connector 15A is electrically connected to negative bus line of first inverter 11A via first negative electrode line 18A. A first branching-off negative electrode line 19A branching off from first negative electrode line 18A is electrically connected to control system common ground 13. As a result, the negative bus line of first inverter 11A and control system common ground 13 are electrically connected to the negative electrode of first in-vehicle battery 7A via first GND harness HA. First branching-off negative electrode line 19A may branch off from first negative electrode line 18A within first negative electrode connector 15A.

Within housing 10 of ECU 2, second negative electrode connector 15B is electrically connected to the negative bus line of second inverter 11B via second negative electrode line 18B. A second branching-off negative electrode line 19B branching off from second negative electrode line 18B is electrically connected to control system common ground 13. As a result, the negative bus line of second inverter 11B and control system common ground 13 are electrically connected to the negative electrode of second in-vehicle battery 7B via second GND harness HB. Second branching-off negative electrode line 19B may branch off from second negative electrode line 18 within second negative electrode connector 15B.

Between the first inverter 11A and the branching-off point of first branching-off positive electrode line 17A of first positive electrode line 16A, there is arranged a first power relay 20A formed by a semiconductor element such as a MOSFET (Metal Oxide Semiconductor Field Effect Transistor). First power relay 20A is turned ON and OFF in accordance with a control signal input from the outside; when it is in the ON state, power supply is executed from first in-vehicle battery 7A to first inverter 11A, and when it is in the OFF state, the power supply from first in-vehicle battery 7A to first inverter 11A is cut off.

Between the second inverter 11B and the branching-off point of second branching-off positive electrode line 17B of second positive electrode line 16B, there is arranged a second power relay 20B similar to first power relay 20A. Second power relay 20B is turned ON and OFF in accordance with a control signal input from the outside; when it is in the ON state, power supply is executed from second in-vehicle battery 7B to second inverter 11B, and when it is in the OFF state, the power supply from second in-vehicle battery 7B to second inverter 11B is cut off.

Between the first inverter 11A and the branching-off point of first branching-off negative electrode line 19A of first negative electrode line 18A, there is arranged a first shunt resistor 21A for detecting a phase current flowing through a first winding set (described below) of the windings of motor 1.

Between the second inverter 11B and the branching-off point of second branching-off negative electrode line 19B of second negative electrode line 18B, there is arranged a second shunt resistor 21B for detecting a phase current flowing through a second winding set (described below) of the windings of motor 1.

In first branching-off negative electrode line 19A, there is arranged a first current-voltage conversion element 22A for detecting a current flowing therethrough, that is, a current flowing between the two electrical systems via the control system common ground (hereinafter referred to as the "common ground current").

In second branching-off negative electrode line 19B, there is arranged a second current-voltage conversion element 22B for detecting a current flowing therethrough, that is, the common ground current.

In the example shown, first current-voltage conversion element 22A is formed by a resistor R1A and a capacitor CA connected in parallel, and second current-voltage conversion element 22B is formed by a resistor RIB and a capacitor C1B connected in parallel. Resistors R1A and RIB correspond to the sensor portion converting the detected current to a voltage. Capacitors CA and CB respectively suppress generation of a transitional difference in potential between the negative bus line of corresponding inverters 11A and 11B and control system common ground 13, and may be provided as needed. For the sake of convenience, it is supposed that resistors R1A and RIB exhibit the same resistance value.

First control circuit 12A serves to control the output of first inverter 11A, and includes a first power circuit 23A, a first microcomputer 24A, a first driving circuit 25A, a first current detection circuit 26A, etc.

Second control circuit 12B serves to control the output of second inverter 11B, and includes a second power circuit 23B, a second microcomputer 24B, a second driving circuit 25B, a second current detection circuit 26B, etc.

Power circuits 23A and 23B, microcomputers 24A and 24B, and driving circuits 25A and 25B are respectively connected to control system common ground 13.

First power circuit 23A is electrically connected to first branching-off positive electrode line 17A, and power source voltage of first in-vehicle battery 7A is applied thereto, generating a first inner power source voltage VA of, for example, 5 V. First inner power source voltage VA is supplied to first microcomputer 24A, first driving circuit 25A, and first current detection circuit 26A. In first branching-off positive electrode line 17A, there is arranged a diode DA in order to suppress a backward flow from first power circuit 23A to first positive electrode connector 14A.

Second power circuit 23B is electrically connected to second branching-off positive electrode line 17B, and power source voltage of second in-vehicle battery 7B is applied thereto, generating a second inner power source voltage VB of, for example, 5 V. Second inner power source voltage VB is supplied to second microcomputer 24B, second driving circuit 25B, and second current detection circuit 26B. In second branching-off positive electrode line 17B, there is arranged a diode DB in order to suppress a backward flow from second power circuit 23B to second positive electrode connector 14B.

Microcomputers 24A and 24B respectively include a processor such as a CPU (Central Processing Unit), a non-volatile memory such as a ROM (Read Only Memory), a volatile memory such as a RAM (Random Access Memory), an input/output interface, etc. Microcomputers 24A and 24B are configured to allow communication with each other via a communication line 27.

As described above, microcomputers 24A and 24B calculate a target torque, and, based on this target torque, calculate a target current value which is a target value of the energization amount of motor 1 (for example, a q-axis current). Based on the target current value and a predetermined output ratio of inverters 11A and 11B (e.g., 50%: 50%), microcomputers 24A and 24B calculate a target current value for each electrical system. In the following, the target current value for the first electrical system will be referred to as a first target current value, and the target current value for the second electrical system will be referred to as a second target current value.

First microcomputer 24A calculates the energization amount with respect to the first electrical system of motor 1 based on the detection value of the phase current detected by first shunt resistor 21A, and performs current control such that this energization amount approximates the first target current value. More specifically, using PI control or the like, first microcomputer 24A generates a first inverter control signal based on the differential between the energization amount related to the first electrical system and the first target current value. This first inverter control signal is a signal for controlling the output of first inverter 11A.

Second microcomputer 24B calculates the energization amount with respect to the second electrical system of motor 1 based on the detection value of the phase current detected by second shunt resistor 21B, and performs current control such that this energization amount approximates the second target current value. More specifically, using PI control or the like, second microcomputer 24B generates a second inverter control signal based on the deviation between the energization amount with respect to the second electrical system and the second target current value. This second inverter control signal is a signal for controlling the output of second inverter 11B.

As the inverter control signals generated by microcomputers 24A and 24B, there are generated, for example, PWM (Pulse Width Modulation) signals. Microcomputers 24A and 24B output the respectively generated inverter control signals from a digital output terminal DO1.

Furthermore, microcomputers 24A and 24B respectively perform abnormality diagnosis in which it is determined, based on the output voltage of own current detection circuit of current detection circuits 26A and 26B, whether or not resistance value increase abnormality such as open failure has been generated in the ground harnesses of the own system. Microcomputers 24A and 24B communicates with each other by means of communication line 27, and share information gained in the abnormality diagnosis of at least its own system or the other system.

First driving circuit 25A converts a first inverter control signal output from digital output terminal DO1 of microcomputer 24A to a gate driving signal for driving a switching element of first inverter 11A and outputs the same.

Second driving circuit 25B converts a second inverter control signal output from digital output terminal DO1 of second microcomputer 24B to a gate driving signal for driving a switching element of second inverter 11B and outputs the same.

Assuming that the inner power source voltage is being supplied to microcomputers 24A and 24B, current detection circuits 26A and 26B are used for abnormality diagnosis of GND harnesses HA and HB respectively both during the output stop period and during the output period of inverters 11A and 11B.

First current detection circuit 26A is of a relatively simple structure, and is a circuit detecting a common ground current (the magnitude and direction of the current) directly, without the intermediation of an amplification circuit or a buffer circuit, by using a first current-voltage conversion element 22A. In the example shown, first current detection circuit 26A is formed by an NPN transistor TrA and resistors R2A and R3A. A first inner power source voltage VA is supplied from first power circuit 23A to the collector terminal of NPN transistor TrA via resistor R2A. The base terminal of NPN transistor TrA is connected to a digital output terminal DO2 of first microcomputer 24A. The emitter terminal of NPN transistor TrA is connected, via resistor R3A, to first branching-off negative electrode line 19A opposite control system common ground 13 with respect to resistor RIA. The current path between the emitter terminal of NPN transistor TrA and resistor R3A is connected to an analog input terminal AD of first microcomputer 24A, and the voltage of this current path constitutes an output voltage EA of first current detection circuit 26A.

Like first current detection circuit 26A, second current detection circuit 26B is a circuit detecting the common ground current (the magnitude and direction of the current) directly, without the intermediation of an amplification circuit or a buffer circuit, by using second current-voltage conversion element 22B. In the example shown, second current detection circuit 26B is formed by an NPN transistor TrB and resistors R2B and R3B. A second inner power source voltage VB is supplied from second power circuit 23B to the collector terminal of NPN transistor TrB via resistor R2B. The base terminal of NPN transistor TrB is connected to a digital output terminal DO2 of second microcomputer 24B. The emitter terminal of NPN transistor TrB is connected, via resistor R3B, to second branching-off negative electrode line 19B opposite control system common ground 13 with respect to resistor RIB. The current path between the emitter terminal of NPN transistor TrB and resistor R3B is connected to the analog input terminal AD of second microcomputer 24B, and the voltage of this current path constitutes an output voltage EB of second current detection circuit 26B.

In current detection circuits 26A and 26B, constructed as described above, NPN transistor TrA is set to the ON state through the control of first microcomputer 24A during the output stop period of inverters 11A and 11B, and NPN transistor TrB is set to the ON state through the control of second microcomputer 24B. On the other hand, during the output period of inverters 11A and 11B, NPN transistor TrA is set to the OFF state through the control of first microcomputer 24A, and NPN transistor TrB is set to the OFF state through the control of second microcomputer 24B.

Based on digital data obtained by inputting output voltage EA of first current detection circuit 26A to analog input terminal AD and converting the same, first microcomputer 24A determines whether or not resistance value increase abnormality has been generated at first GND harness HA. Furthermore, based on digital data obtained by inputting output voltage EB of second current detection circuit 26B to analog input terminal AD and converting the same, second microcomputer 24B determines whether or not resistance value increase abnormality has been generated at second GND harness HB.

Figure 3:
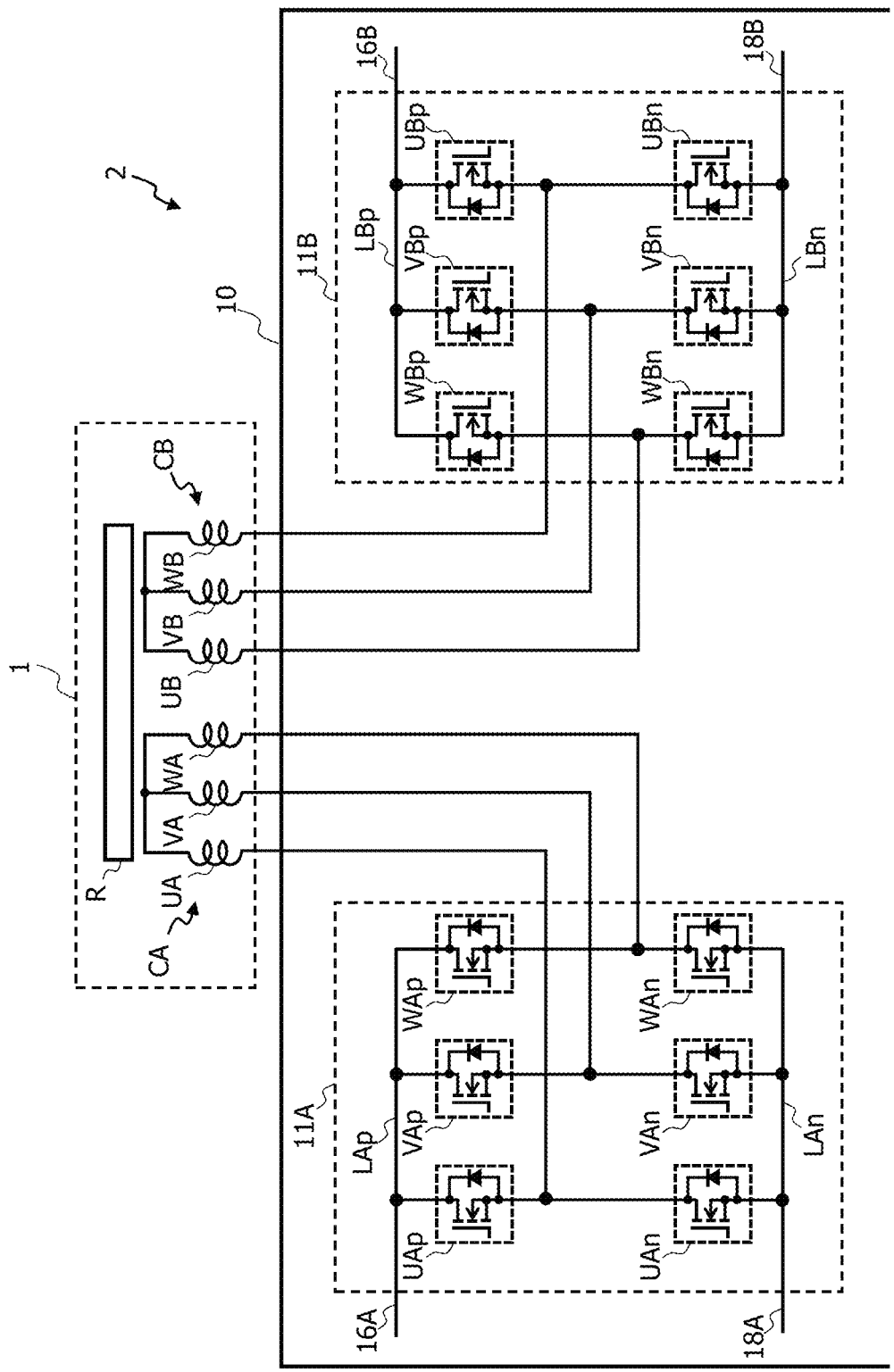
FIG. 3 is a circuit diagram illustrating an example of the interior of an inverter and a motor of the ECU.

FIG. 3 shows an example of the inner structure of motor 1 and inverters 11A and 11B of ECU 2. Motor 1 is a three-phase brushless motor, and includes, for example, a tubular stator (not shown) and a rotor R as a permanent magnet rotor rotatably mounted to the central portion of the stator. The stator includes two winding sets independent of each other: a first winding set CA of the first electrical system and a second winding set CB of the second electrical system. First winding set CA is driven by first inverter 11A, and consists of a three-phase winding formed through Y-connection of a U-phase coil UA, a V-phase coil VA, and a W-phase coil WA. Second winding set CB is driven by second inverter 11B, and consists of a three-phase winding formed through Y-connection of a U-phase coil UB, a V-phase coil VB, and a W-phase coil WB. In a state in which they are insulated from each other, first winding set CA and second winding set CB are wound around the stator, and share a magnetic circuit.

In first inverter 11A, a U-phase arm, a V-phase arm, and a W-phase arm are connected in parallel between a positive bus line LAp connected to first positive electrode line 16A and a negative bus line LAn connected to first negative electrode line 18A. The U-phase arm is formed by connecting in series a switching element UAp of an upper arm and a switching element UAn of a lower arm. The V-phase arm is formed by connecting in series a switching element VAp of the upper arm and a switching element VAn of the lower arm. The W-phase arm is formed by connecting in series a switching element WAp of the upper arm and a switching element WAn of the lower arm. In addition, the portion between the two switching elements UAp and UAn of the U-phase arm is connected to U-phase coil UA; the portion between the two switching elements VAp and VAn of the V-phase arm is connected to V-phase coil VA; and the portion between the two switching elements WAp and WAn of the W-phase arm is connected to W-phase coil WA. As a result, the portion between the two switching elements of each phase arm of first inverter 11A is connected to the coil of the corresponding phase of first winding set CA of motor 1, whereby a three-phase bridge circuit is formed.

In second inverter 11B, the U-phase arm, the V-phase arm, and the W-phase arm are connected in parallel between a positive bus line LBp connected to second positive electrode line 16B and a negative bus line LBn connected to second negative electrode line 18B. The U-phase arm is formed by connecting in series a switching element UBp of the upper arm and a switching element UBn of the lower arm. The V-phase arm is formed by connecting in series a switching element VBp of the upper arm and a switching element VBn of the lower arm. The W-phase arm is formed by connecting in series a switching element WBp of the upper arm and a switching element WBn of the lower arm. In addition, the portion between the two switching elements UBp and UBn of the U-phase arm is connected to the U-phase coil UB; the portion between the two switching elements VBp and VBn of the V-phase arm is connected to V-phase coil VB; and the portion between the two switching elements WBp and WBn of the W-phase arm is connected to W-phase coil WB. As a result, the portion between the two switching elements of each phase arm of second inverter 11B is connected to the coil of the corresponding phase of second winding set CB of motor 1, whereby a three-phase bridge circuit is formed.

Each of switching elements UAp through WBn of inverters 11A and 11B has an anti-parallel reflux diode, and is a power control semiconductor element which is controllable by an inverter control signal output from corresponding microcomputers 24A and 24B. For example, MOSFET (Metal-Oxide-Semiconductor Metal Field-Effect Transistor) or IGBT (Insulated Gate Bipolar Transistor) is applicable to switching elements UAp through WBn of inverters 11A and 11B. In the example shown, as each of switching elements UAp through WBn of inverters 11A and 11B, there is used an n-channel MOSFET, and the parasitic diode thereof is used as the reflux diode.

The current flowing during the output period of inverters 11A and 11B in ECU 2, constructed as described above, will be described with reference to FIGS. 4 and 5. The present invention relates to current restriction executed on resistance value increase abnormality of GND harnesses HA and HB during the output period of inverters 11A and 11B, so that, regarding the current flowing during the output stop period of inverters 11A and 11B, JP 2019-187134 A is to be referred to, and description thereof will be omitted.

Figure 4:
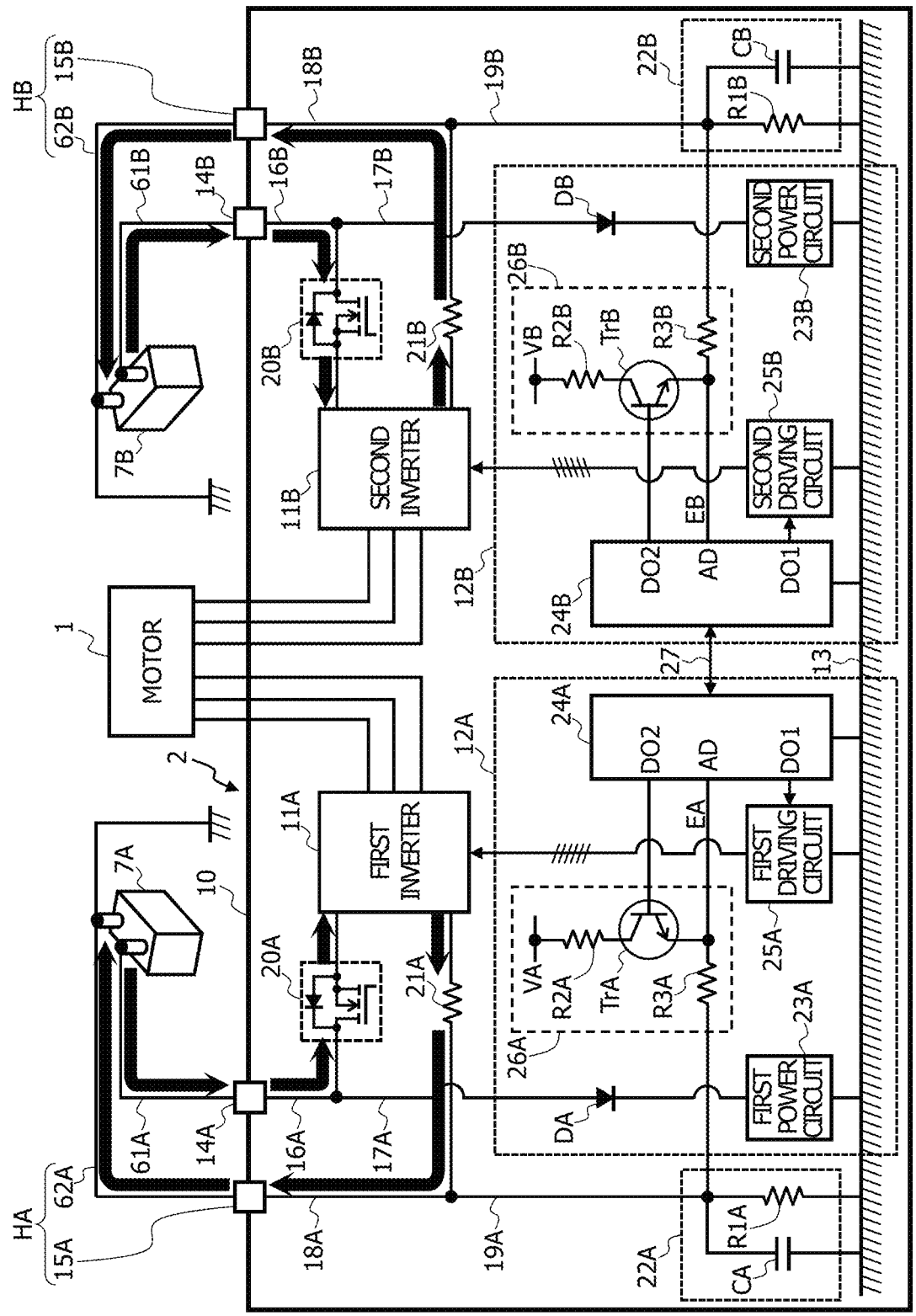
FIG. 4 is a circuit diagram illustrating a current route in a normal state of the ECU.

FIG. 4 shows the current route of ECU 2 during the output period of inverters 11A and 11B in the normal state in which both of the two resistance values of GND harnesses HA and HB are normal, that is, the state in which the two resistance values are substantially the same. Since inverters 11A and 11B are executing output, both of NPN transistors TrA and TrB of current detection circuits 26A and 26B are in the OFF state.

As indicated by the thick solid arrow of FIG. 4, in the first electrical system, the current flows via the following route from the positive electrode to the negative electrode of first in-vehicle battery 7A. That is, the current flowing from the positive electrode to the negative electrode takes its route in the following order: first power source positive electrode line 61A, first positive electrode connector 14A, first power relay 20A, first inverter 11A, first shunt resistor 21A, and first GND harness HA. At this time, output voltage EA of first current detection circuit 26A is at the ground potential, or assumes an approximate value (hereinafter simply referred to as the "ground potential") Vo.

As indicated by the thick solid arrow of FIG. 4, in the second electrical system, a relatively large current flows via the following route from the positive electrode to the negative electrode of second in-vehicle battery 7B. That is, the current flowing from the positive electrode to the negative electrode of second in-vehicle battery 7B takes its route in the following order: second power source positive electrode line 61B, second positive electrode connector 14B, second power relay 20B, second inverter 11B, second shunt resistor 21B, and second GND harness HB. At this time, output voltage EB of second current detection circuit 26B is at the ground potential $V_0$.

Figure 5:
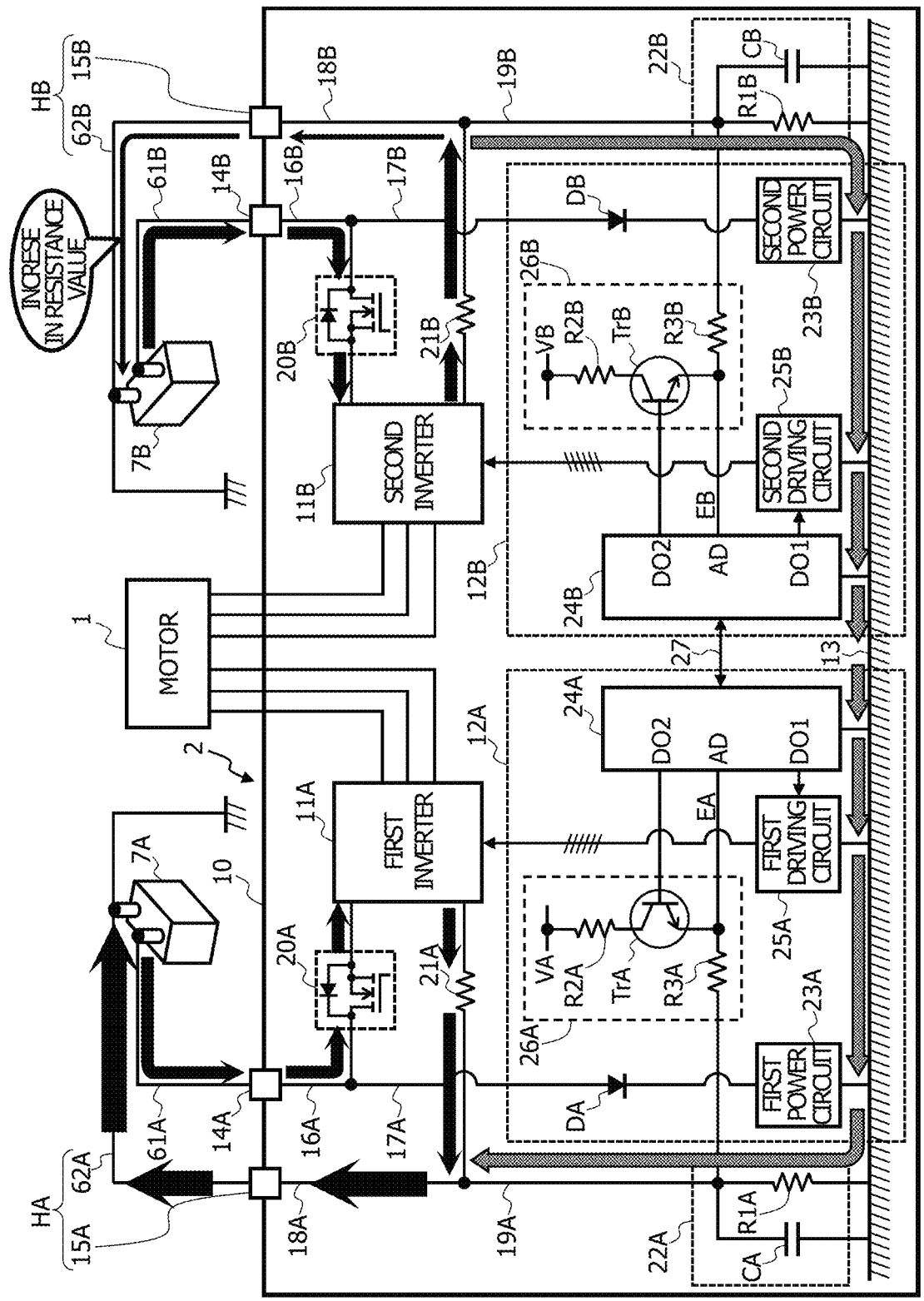
FIG. 5 is a circuit diagram illustrating a current route in an abnormal state of the ECU.

FIG. 5 shows the current route of ECU 2 during the output period of inverters 11A and 11B in the abnormal state in which the resistance value of first GND harness HA is normal and in which the resistance value of second GND harness HB has increased.

As in the normal state, in the first electrical system, the current flows from the positive electrode to the negative electrode of first in-vehicle battery 7A via the following route (see the thick solid arrow). That is, the current flowing from the positive electrode to the negative electrode takes its route in the following order: first power source positive electrode line 61A, first positive electrode connector 14A, first power relay 20A, first inverter 11A, first shunt resistor 21A, and first GND harness HA. At this time, as in the normal state, output voltage EA of first current detection circuit 26A is at the ground potential $V_0$.

On the other hand, as in the normal state, in the second electrical system, the current flows from the positive electrode of second in-vehicle battery 7B to second shunt resistor 21B in the following order: second power source positive electrode line 61B, second positive electrode connector 14B, second power relay 20B, and second inverter 11B (see the thick solid arrow). However, since resistance value increase abnormality has been generated in second GND harness HB, current starts to flow from second shunt resistor 21B to control system common ground 13 via second branching-off negative electrode line 19B. This current further flows to first GND harness HA via first branching-off negative electrode line 19A and first negative electrode line 18A. Thus, as the differential of the two resistance values of first GND harness HA and second GND harness HB increases, the common ground current flowing from the second electrical system to the first electrical system also increases. When the common ground current increases, the voltage drop at resistors R1A and R1B becomes greater, so that output voltage EB of second current detection circuit 26B rises from the ground potential $V_0$. At this time, output voltage EB of second current detection circuit 26B indirectly indicates the magnitude of the common ground current.

Although not shown, in the abnormal state in which the resistance value of second GND harness HB is normal and in which the resistance value of first GND harness HA has increased, output voltage EA of first current detection circuit 26A rises like output voltage EB of second current detection circuit 26B. At this time, output voltage EA of first current detection circuit 26A indirectly indicates the magnitude of the common ground current.

As described above, output voltages EA and EB vary between the normal state and the abnormal state. Thus, in the abnormality diagnosis, microcomputers 24A and 24B obtain output voltages EA and EB, and, based on output voltages EA and EB obtained, determine whether or not resistance value increase abnormality has been generated in GND harnesses HA and HB. That is, when it is determined that none of output voltage EA and output voltage EB deviates from the ground potential $V_0$ (more specifically, less than a predetermined voltage $V_{th1}$), microcomputers 24A and 24B determine that no resistance value increase abnormality has been generated in GND harnesses HA and HB. On the other hand, when it is determined that output voltage EA deviates from the ground potential $V_0$ (more specifically, not less than the predetermined voltage $V_{th1}$), microcomputers 24A and 24B determine that the common ground current is flowing from the first electrical system to the second electrical system, and determine that resistance value increase abnormality has been generated at first GND harness HA. When it is determined that output voltage EB deviates from the ground potential $V_0$ (more specifically, not less than the predetermined voltage $V_{th1}$), microcomputers 24A and 24B determine that the common ground current is flowing from the second electrical system to the first electrical system, and determine that resistance value increase abnormality has been generated at second GND harness HB.

When one of microcomputers 24A and 24B has determined that the output voltage of the current detection circuit of its own system deviates from the ground potential $V_0$, it may be determined that resistance value increase abnormality has been generated in the GND harness of its own system without waiting for the reception of information on the output voltage of the current detection circuit of the other system.

Figure 6:
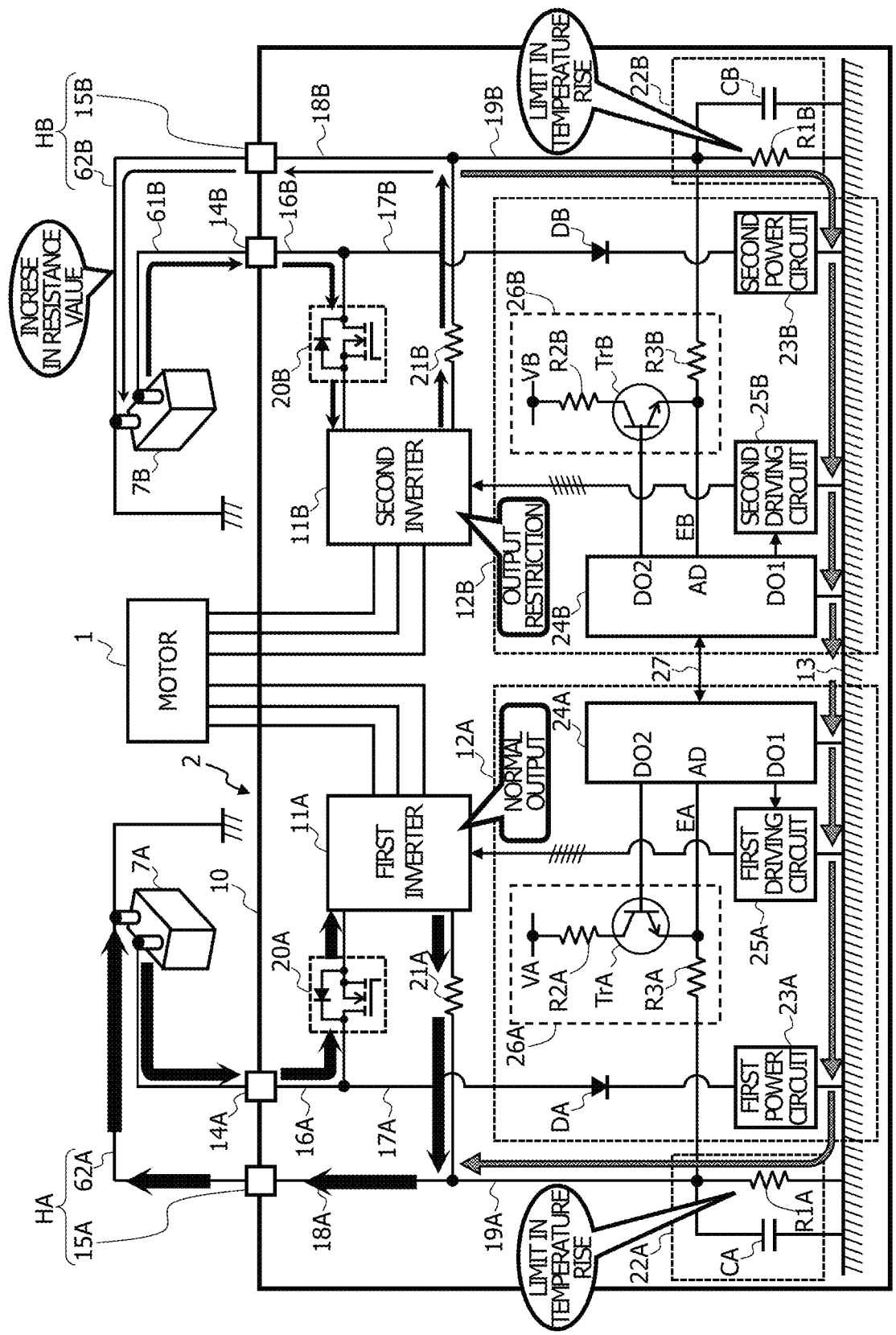
FIG. 6 is a circuit diagram illustrating a current route when abnormality processing is performed in the ECU.

FIG. 6 shows the current flowing through ECU 2 when abnormality processing is performed on the abnormality state of FIG. 5. When it is determined in the abnormality diagnosis that resistance value increase abnormality has been generated at second GND harness HB, second microcomputer 24B executes current restriction with respect to the inverter output of its own system as the abnormality processing irrespective of the second target current value set. It should be noted, however, that second microcomputer 24B determines the timing with which the current restriction of its own system is started based on the rise temperature of the component (hereinafter referred to as the "low heat resistance component") of ECU 2 that is likely to exceed the limit in terms of the heat resistance performance and/or the durability performance earliest due to the Joule heat accompanying the current passing through resistors R1A and R1B. While in FIG. 6 resistors R1A and R1B constitute the low heat resistance component, this should not be construed restrictively; microcomputers 24A and 24B, etc., may constitute the same.

As the rise temperature of the low heat resistance component, the transitional rise temperature $\Delta T(t)$ when a period of time t has elapsed since the common ground current starts to flow is used. In the transitional rise temperature $\Delta T(t)$, a primary delay is taken into consideration as well as the saturation rise temperature $\Delta Tc$ when the temperature rise of the low heat resistance component is saturated.

For example, by using the saturation rise temperature $\Delta Tc$, the heat capacity $C[J/K]$ of the low heat resistance component, and the thermal resistance $\theta[K/W]$ from the heat generation source of resistor R1A or resistor R1B to the object portion of the low heat resistance component in which the limit in terms of the heat resistance performance and/or the durability performance is determined, the transitional rise temperature $\Delta T(t)$ can be expressed by the following equation:

$$\Delta T(t)=\Delta Tc*(1-e^{(-t/\theta C)}) \quad (1)$$

Here, the saturation rise temperature $\Delta Tc$ of the low heat resistance component can be expressed by the following equation using the power consumption P of resistors R1A and R1B and the thermal resistance $\theta$:

$$\Delta Tc=P*\theta \quad (2)$$

The power consumption P of resistors R1A and R1B can be expressed by the following equation using the common ground current i and the resistance value r of resistors R1A and R1B:

$$P = i^2 * r \quad (3)$$

By using equations (1) through (3), second microcomputer 24B can calculate the transitional rise temperature ΔT(t) of the low heat resistance component at each control cycle. At this time, the count time elapsed since it is diagnosed that resistance value increase abnormality has been generated at GND harnesses HB is substituted for the time t of equation (1). The magnitude of the common ground current obtained based on output voltage EB of second current detection circuit 26B is substituted for the common ground current i of equation (3). The constants of equations (1) through (3), that is, the heat capacity C, the thermal resistance θ, and the resistance value r are obtained beforehand through experiment, simulation or the like, and are stored in the ROM, etc. of second microcomputer 24B, and are read out for use from the ROM, etc., at the time of calculation of the transitional rise temperature ΔT(t).

A transitional absolute temperature T(t), which is the absolute temperature of the low heat resistance component when the period of time t has elapsed since the common ground current starts to flow, is expressed by the following equation using an atmosphere temperature Ta:

$$T(t) = \Delta T(t) + Ta \quad (4)$$

In the case in which ECU 2 is equipped with a thermistor (not shown) for measuring the atmosphere temperature of the interior thereof, second microcomputer 24B obtains, at each control cycle, the atmosphere temperature based on the output signal of the thermistor, and makes it possible to calculate the transitional absolute temperature T(t) by substituting the obtained data for the atmosphere temperature Ta of equation (4).

In addition, second microcomputer 24B starts current restriction when the transitional rise temperature ΔT(t) of the low heat resistance component has risen up to a predetermined limit rise temperature $\Delta T_{lim}$ which is rise temperature permissible from the viewpoint of the resistance heat cycle performance of the low heat resistance component, that is, when the rise temperature condition is satisfied.

Alternatively, second microcomputer 24B starts current restriction when the transitional absolute temperature T(t) of the low heat resistance component has risen up to a predetermined limit absolute temperature $T_{lim}$, which is an absolute temperature permissible from the viewpoint of the heat resistance performance of the low heat resistance component, that is, when the absolute temperature condition is satisfied.

In the case in which second microcomputer 24B determines the current restriction start timing based on both the transitional rise temperature ΔT(t) and the transitional absolute temperature T(t), the current restriction may be started when at least one of the rise temperature condition and the absolute temperature condition is satisfied.

In the case in which there are two or more low heat resistance components such as resistors R1A and R1A having similar the heat resistance performance and durability performance, the current restriction may be started when at least one of the rise temperature condition and the absolute temperature condition is satisfied in one of the low heat resistance components.

In executing the current restriction, second microcomputer 24B outputs a second inverter control signal so that output voltage EB is less than a predetermined voltage $V_{th1}$ to restrict the output of second inverter 11B, or second microcomputer 24B places second power relay 20B in the OFF state. To reliably protect the low heat resistance component, second microcomputer 24B may perform both the output restriction of second inverter 11B and the OFF driving of second power relay 20B.

On the other hand, as in the normal state, first microcomputer 24A generates a first inverter control signal based on PI control or the like so that energization amount with respect to the first electrical system of motor 1 approximates the first target current value, and maintains the output of first inverter 11A. However, due to the current restriction of its own system by second microcomputer 24B, the common ground current is reduced, so that the energization amount of first GND harness HA into which the common ground current has flowed is reduced, making it possible to execute overheating protection of first GND harness HA.

Although not shown, in the case in which it is determined in the abnormality diagnosis that resistance increase abnormality has been generated at first GND harness HA, first microcomputer 24A starts the current restriction like second microcomputer 24B irrespective of the first target current value set, and reduces the common ground current. On the other hand, microcomputer 24B maintains the output of second inverter 11B as in the normal state. As a result, the energization amount of second GND harness HB into which the common ground current has flowed is reduced, making it possible to execute overheating protection of second GND harness HB.

According to ECU 2 as described above, even when resistance value increase abnormality is detected in GND harnesses HA or HB, the current restriction of the abnormal system is not conducted immediately, and the start of the current restriction is delayed within a range in which a rise in temperature of the low heat resistance component does not exceed the limit in terms of the heat resistance performance and/or the durability performance. As a result, it is possible to prolong as much as possible the period of time elapsed until the apparatus function of the electric steering apparatus is restricted.

Figure 7:
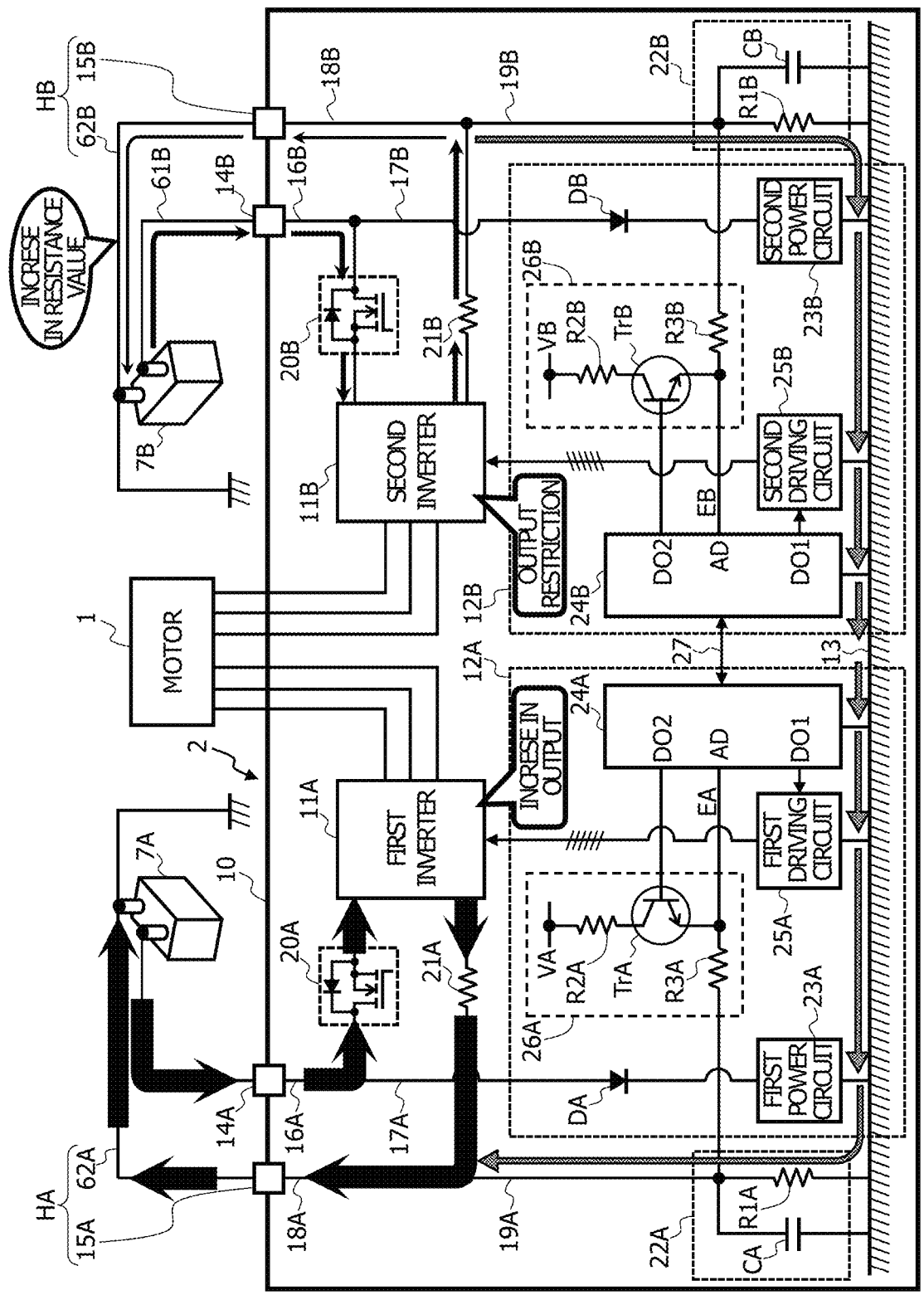
FIG. 7 is a circuit diagram illustrating a current route when other abnormality processing is performed in the ECU.

FIG. 7 shows the current flowing through ECU 2 when other abnormality processing is performed with respect to the abnormal state of FIG. 5.

With respect to the abnormal state of FIG. 5, when at least one of the rise temperature condition and the absolute temperature condition is satisfied, second microcomputer 24B starts the current restriction of its own system as the abnormality processing, so that the energization amount related to the second electrical system of motor 1 is reduced. On the other hand, first microcomputer 24A performs as usual the output of first inverter 11A through current control similar to that in the normal state, so that the reduction in the energization amount related to the second electrical system of motor 1 is not compensated for by the energization amount related to the first electrical system of motor 1. This measure is taken in order that the energization amount of first GND harness HA does not exceed the permissible current value permissible from the viewpoint of overheating protection; it should be noted, however, that the energization amount of motor 1 is not sufficient to generate a torque corresponding to the target torque, and the function of electric steering apparatus 100 is markedly restricted. On the other hand, in the case in which the target torque of motor 1 is relatively low, the first target current value and the second target current value of each electrical system are also low, so that it is to be assumed that the energization amount of GND harness is of a value sufficiently low with respect to the permissible current value.

Thus, as shown in FIG. 7, as other abnormality processing with respect to the abnormal state of FIG. 5, first microcomputer 24A can increase the output of first inverter 11A so as to compensate for the reduction in energization amount related to the second electrical system of motor 1 in the case in which the target torque of motor 1 is relatively low.

More specifically, in the case in which the first target current value is of a value sufficiently low with respect to the permissible current value of first GND harness HA, first microcomputer 24A takes the following measure. That is, first microcomputer 24A adds, to the first target current value, the differential between the energization amount related to the second electrical system of motor 1 calculated by using a phase current detected by second shunt resistor 21B and the second target current value of the second electrical system to set a new first target current value. However, in the case in which the new first target current value exceeds the permissible current value of first GND harness HA, the new first target current value is re-set to a permissible current value or an approximate value lower than that. Then, first microcomputer 24A conducts current control such that the energization amount related to the first electrical system of motor 1 approximates the new first target current value. As a result, the energization amount related to the first electrical system of motor 1 increases to enable a torque generated by motor 1 to approximate to the target torque, so that it is possible to mitigate the functional restriction of electric steering apparatus 100.

Although not shown, with respect to the abnormal state in which the resistance value of second GND harness HB is normal and in which the resistance value of first GND harness HA has increased, first microcomputer 24A starts the current restriction of its own system as the abnormality processing when at least one of the rise temperature condition and the absolute temperature condition is satisfied, so that the energization amount related to the first electrical system of motor 1 is reduced. In view of this, in the case in which the target torque of motor 1 is relatively low, second microcomputer 24B can increase the output of second inverter 11B so as to compensate for the reduction in the energization amount related to the first electrical system of motor 1. As a result, the energization amount related to the second electrical system of motor 1 increases to enable a torque generated by motor 1 to approximate the target torque, so that it is possible to mitigate the functional restriction of electric steering apparatus 100.

Second Embodiment

Figure 8:
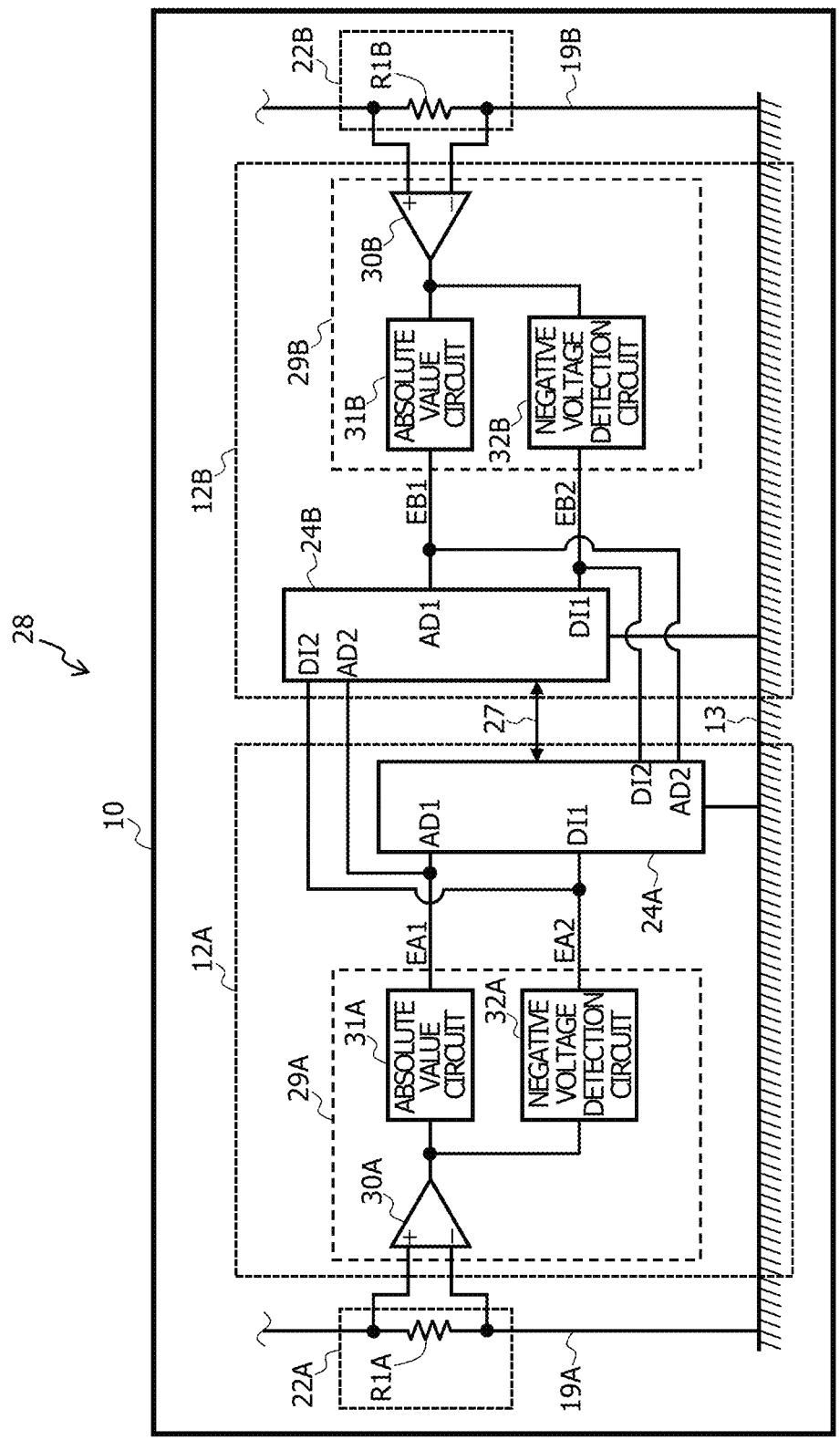
FIG. 8 is a circuit diagram illustrating a main portion of the inner structure of an ECU according to a second embodiment.

FIG. 8 shows the main portion of the inner structure of an ECU 28 according to the second embodiment. It should be noted that, regarding the present embodiment, mainly the portions different from ECU 2 of the first embodiment will be described, and as for the other portions, the description of the first embodiment is applicable as long as there is no conflict. Thus, the portions that are the same as or similar to ECU 2 of the first embodiment are indicated by the same reference numerals, and a description thereof will be omitted or simplified.

As compared with ECU 2, ECU 28 is different in current detection manner. That is, in ECU 2, the microcomputer of the electrical system in which resistance value increase abnormality has been generated can obtain the magnitude and direction of the common ground current, whereas the microcomputer of the normal electrical system can only obtain the direction of the common ground current and cannot obtain the magnitude of the common ground current. In contrast, in ECU 28, it is possible to obtain the magnitude and direction of the common ground current in both the systems.

A first control circuit 12A includes a first current detection circuit 29A different from first current detection circuit 26A in current detection manner. A second control circuit 12B includes a second current detection circuit 29B different from second current detection circuit 26B in current detection manner.

First current detection circuit 29A has a differential amplification circuit 30A, an absolute value circuit 31A, and a negative voltage detection circuit 32A. Differential amplification circuit 30A is formed by using an operation amplifier operated by both positive and negative power sources. A non-inversion input terminal (+) of this operation amplifier is connected to first branching-off negative electrode line 19A opposite control system common ground 13 with respect to resistor R1A of first current-voltage conversion element 22A. An inversion input terminal (−) of the operation amplifier is connected to first branching-off negative electrode line 19A between resistor R1A of first current-voltage conversion element 22A and control system common ground 13. In addition, the operation amplifier amplifies the difference between the voltage input to the non-inversion input terminal (+) and the voltage input to the inversion input terminal (−), and outputs this amplification signal from an output terminal to absolute value circuit 31A and a negative voltage detection circuit 32A. Absolute value circuit 31A is a circuit which, if the amplification signal input is of negative voltage, converts it to a voltage EA1 of the absolute value thereof and outputs the same. Negative voltage detection circuit 32A is a circuit formed so as to output two different positive voltages EA2 according to whether the amplification signal input is of positive or negative voltage; for example, when the voltage of the amplification signal is positive, it outputs a relatively high voltage (Hi), and when the voltage of the amplification signal is negative, it outputs a relatively low voltage (Lo).

Second current detection circuit 29B is of a structure similar to that of first current detection circuit 29A, and has a differential amplification circuit 30B, an absolute value circuit 31B, and a negative voltage detection circuit 32B. Differential amplification circuit 30B is formed by using an operation amplifier operated by both positive and negative power sources. A non-inversion input terminal (+) of this operation amplifier is connected to second branching-off negative electrode line 19B opposite control system common ground 13 with respect to resistor R1B of second current-voltage conversion element 22B. An inversion input terminal (−) of the operation amplifier is connected to second branching-off negative electrode line 19B between resistor R1B of second current-voltage conversion element 22B of second branching-off negative electrode line 19B and control system common ground 13. In addition, the operation amplifier amplifies the difference between the voltage input to the non-inversion input terminal (+) and the voltage input to the inversion input terminal (−), and outputs this amplification signal from an output terminal to absolute value circuit 31B and a negative voltage detection circuit 32B. Absolute value circuit 31B is a circuit which, if the amplification signal input is of negative voltage, converts it to voltage EB1 of the absolute value thereof and outputs the same. Negative voltage detection circuit 32B is a circuit formed so as to output two different positive voltages EB2 according to whether the amplification signal input is of positive or negative voltage; for example, it outputs a relatively high voltage (Hi) when the amplification signal is of positive voltage, and outputs a relatively low voltage (Lo) when the amplification signal is of negative voltage.

First microcomputer 24A inputs an output voltage EA1 of absolute value circuit 31A to an analog input terminal AD1, and inputs an output voltage EA2 of negative voltage detection circuit 32A to a digital input terminal DI1. Then, first microcomputer 24A obtains the magnitude of the common ground current based on output voltage EA1 of absolute value circuit 31A, and obtains the direction of the common ground current based on output voltage EA2 of negative voltage detection circuit 32A.

Second microcomputer 24B inputs an output voltage EB1 of absolute value circuit 31B to analog input terminal AD1, and inputs an output voltage EB2 of negative voltage detection circuit 32B to digital input terminal DI1. Then, second microcomputer 24B obtains the magnitude of the common ground current based on output voltage EB1 of absolute value circuit 31B, and obtains the direction of the common ground current based on output voltage EB2 of negative voltage detection circuit 32B.

When output voltage EA1 of absolute value circuit 31A deviates from zero (more specifically, not less than a predetermined voltage $V_{th2}$), and output voltage EA2 of negative voltage detection circuit 32A is Hi voltage, the common ground current is flowing from the first electrical system to the second electrical system. Thus, first microcomputer 24A, which has detected these output voltages EA1 and EA2, determines that resistance value increase abnormality has been generated at first GND harness HA.

On the other hand, when output voltage EA1 of absolute value circuit 31A deviates from zero (more specifically, not less than a predetermined voltage $V_{th2}$), and output voltage EA2 of negative voltage detection circuit 32A is Low voltage, the common ground current is flowing from the second electrical system to the first electrical system. Thus, first microcomputer 24A, which has detected these output voltages EA1 and EA2, determines that resistance value increase abnormality has been generated at second GND harness HB.

When output voltage EB1 of absolute value circuit 31B is not less than the predetermined voltage $V_{th2}$, and output voltage EB2 of negative voltage detection circuit 32B is Hi voltage, the common ground current is flowing from the second electrical system to the first electrical system. Thus, second microcomputer 24B, which has detected these output voltages EB1 and EB2, determines that resistance value increase abnormality has been generated at second GND harness HB.

On the other hand, when output voltage EB1 of absolute value circuit 31B is not less than the predetermined voltage $V_{th2}$, and output voltage EB2 of negative voltage detection circuit 32B is Low voltage, the common ground current is flowing from the first electrical system to the second electrical system. Thus, second microcomputer 24B, which has detected these output voltages EB1 and EB2, determines that resistance value increase abnormality has been generated at first GND harness HA.

Since there is an electrical variation between the current detection means of the two electrical systems, for example, between resistors R1A and RIB and between current detection circuits 29A and 29B, it is to be assumed that there is a deviation between microcomputers 24A and 24B in the timing with which it is determined that resistance value increase abnormality has been generated at GND harnesses HA or HB. Thus, when the microcomputer of one electrical system first detects resistance value increase abnormality, abnormality detection information is supplied to the microcomputer of the other electrical system.

When it determines that resistance value increase abnormality has been generated at the GND harness of its own system, microcomputer 24A, 24B does not immediately execute the current restriction of the abnormal system but starts the calculation of the transitional rise temperature $\Delta T(t)$ and the transitional absolute temperature $T(t)$ as described above. Then, the microcomputer of the electrical system in which resistance value increase abnormality has been generated at the GND harness starts the current restriction when at least one of the rise temperature condition and the absolute temperature condition is satisfied.

In ECU 28, constructed as described above, it is to be assumed that failure is generated at the current detection means in one electrical system. That is, in the first electrical system, it is to be assumed that failure is generated in at least one of resistor R1A of first current-voltage conversion element 22A and first current detection circuit 29A. Alternatively, in the second electrical system, it is to be assumed that failure is generated in at least one of resistor RIB of second current-voltage conversion element 22B and second current detection circuit 29B.

Thus, it is desirable for the microcomputer of one electrical system in which failure has been generated at the current detection means to be capable of obtaining the magnitude and direction of the common ground current by using the normal current detection means of the other electrical system. In view of this, ECU 28 is formed such that first microcomputer 24A inputs the output voltage of second current detection circuit 29B and that second microcomputer 24B inputs the output voltage of first current detection circuit 29A.

More specifically, first microcomputer 24A inputs output voltage EB1 of absolute value circuit 31B to analog input terminal AD2, and inputs output voltage EB2 of negative voltage detection circuit 32B to digital input terminal DI2. Second microcomputer 24B inputs output voltage EA1 of absolute value circuit 31A to analog input terminal AD2, and inputs output voltage EA2 of negative voltage detection circuit 32A to digital input terminal DI2.

It is possible to determine whether or not the current detection means is out of order based on whether or not one of output voltage EA1, EA2 and output voltage EB1, EB2 has deviated from the assumable voltage range. For example, in the case in which both output voltage EA2 and output voltage EB2 are Hi voltage or Low voltage, it results in a determination that the common ground current is flowing in a different direction, so that it is possible to determine that there is the possibility of the current detection means being out of order. In the case in which the common ground current respectively obtained from output voltage EA1 or output voltage EB1 is markedly larger than the energization amount related to each electrical system of motor 1, it is possible to determine that there is the possibility of the current detection means being out of order.

According to ECU 28 as described above, as in ECU 2, the start of the current restriction is delayed within a range in which a rise in temperature of the low heat resistance component does not exceed the limit in terms of the heat resistance performance and/or the durability performance. As a result, it is possible to elongate as much as possible the period of time elapsed until the apparatus function of the electric steering apparatus is restricted. Furthermore, the microcomputer of one electrical system in which failure has been generated at the current detection means can obtain the magnitude and direction of the common ground current by using the normal current detection means of the other electrical system, so that it is possible to improve the reliability of the electric steering apparatus through redundancy in current detection.

It is obviously possible for those skilled in the art to adopt various modifications as follows based on the basic technical idea and teaching of the present invention, although the contents of the present invention have been specifically described with reference to the embodiments.

In ECU 28, only one of the electrical systems may include current detection means. For example, it is possible to omit second current-voltage conversion element 22B and second current detection circuit 29B, and second microcomputer 24B can input output voltage EA, EB of first current detection circuit 29A.

When microcomputer 24A, 24B calculates at each control cycle the transitional rise temperature $\Delta T(t)$ or the transitional absolute temperature $T(t)$, the average value of the common ground current detected after the determination of resistance value increase abnormality may be used as the common ground current i of equation (3). This is because the inverter output may vary due to a change in the target torque, etc.

In the case in which it is determined that both output voltages EA and EB deviate from the ground potential $V_0$ or that both output voltages EA2 and EB2 are of Hi voltage, microcomputers 24A and 24B may conduct the following diagnosis. That is, microcomputers 24A and 24B can determine that resistance value increase abnormality has been generated in the GND harnesses of both electrical systems and that short-circuiting to the body earth, etc., has been generated in control system common ground 13.

In ECU 28, instead of the microcomputer of one electrical system inputting the output voltage from the current detection circuit of the other electrical system, another current detection circuit may be provided in the control circuit of one electrical system, and the both end voltage of the resistor of the other electrical system may be input to this other current detection circuit. For example, instead of first microcomputer 24A directly inputting output voltages EB1 and EB2 of second current detection circuit 29B, first control circuit 12A may be provided with another current detection circuit, and the both end voltage of resistor RIB may be input to this other current detection circuit. As a result, first microcomputer 24A can input the output voltage of first current detection circuit 29A and the output voltage of the other current detection circuit, making it possible to diagnose the resistance value increase abnormality by using a normal output voltage among the two output voltages. This also applies to second microcomputer 24B.

The predetermined voltage $V_{th1}$, $V_{th2}$ may be set as the output voltage of the current detection circuit when the common ground current, which flows when the differential between the two resistance values of GND harnesses HA and HB is of a predetermined value, is detected. For example, the predetermined value can be defined as the differential between the two resistance values of GND harnesses HA and HB when there is generated a common ground current making the saturation rise temperature $\Delta Tc$ of the low heat resistance component of ECU 2, 28 the same value as the limit rise temperature $\Delta T_{lim}$. The predetermined value is thus defined because, in the case of a common ground current making the saturation rise temperature $\Delta Tc$ less than the limit rise temperature $\Delta T_{lim}$, it is unlikely that a rise of temperature of the low heat resistance component exceeds the limit in terms of the durability performance.

Furthermore, for example, the predetermined value can be defined as the differential between the two resistance values of GND harnesses HA and HB when generating a common ground current making the saturation absolute temperature Tc, obtained through addition of the saturation rise temperature $\Delta Tc$ of the low heat resistance component of ECU 2 and the atmosphere temperature Ta, the same value as the limit absolute temperature $T_{lim}$. The predetermined value is thus defined because, in the case of a common ground current making the saturation absolute temperature Tc less than the limit absolute temperature $T_{lim}$, it is unlikely that a rise of the low heat resistance component exceeds the limit in terms of the heat resistance performance.

In the case in which the current restriction is started when at least one of the rise temperature condition and the absolute temperature condition is satisfied, the predetermined value may be set as follows. That is, it is possible to select the lower of the following two predetermined values: the predetermined value defined as the differential between the two resistance values when the saturation rise temperature $\Delta Tc$ attains the limit rise temperature $\Delta T_{lim}$, and the predetermined value defined as the differential between the two resistance values when the saturation absolute temperature attains the limit absolute temperature $T_{lim}$.

When the output voltage of the current detection circuit attains the predetermined voltage $V_{th1}$, $V_{th2}$, and the transitional rise temperature $\Delta T(t)$ and the transitional absolute temperature $T(t)$ are calculated, it is possible to suppose that the differential between the two resistance values of GND harnesses HA and HB is the predetermined value. Thus, as the common ground current i in equation (3), it is possible to use the known current value of the common ground current which flows when the differential between the two resistance values of GND harnesses HA and HB is the predetermined value.

While electric steering apparatus 100 is redundantly configured with two electrical systems, it may also be redundantly configured with three or more electrical systems. Also, in the ECU of an electric steering apparatus 100 having three or more electrical systems, the common ground current flowing from a part of an electrical system in which resistance value increase abnormality has been generated in GND harness into the normal electrical system can be detected by the current detection means. In addition, it is possible to delay the start of the current restriction within a range in which the low heat resistance component does not exceed the limit in terms of the heat resistance performance and/or the durability performance.

As the electric control device according to the present invention, there has been described by way of example ECU 2, 28 conducting the driving control of motor 1 in electric steering apparatus 100. It should be noted, however, that this electric control device is applicable to any in-vehicle apparatus so long as it is equipped with a current detection means which performs energization control independently for each electrical system in an in-vehicle apparatus redundantly configured with a plurality of electrical systems so as to detect a common ground current.

The technical ideas described with reference to the embodiments and modifications thereof may be combined for use as appropriate so long as no contradiction is involved.

REFERENCE SYMBOL LIST

1 Electric motor
2, 28 ECU

7A First in-vehicle battery
7B Second in-vehicle battery
11A First inverter
11B Second inverter
13 Control system common ground
14A First positive electrode connector
14B Second positive electrode connector
15A First negative electrode connector
15B Second negative electrode connector
19A First branching-off negative electrode line
19B Second branching-off negative electrode line
22A First current-voltage conversion element
22B Second current-voltage conversion element
24A First microcomputer
24B Second microcomputer
26A, 29A First current detection circuit
26B, 29B Second current detection circuit
62A First power source negative electrode line
62B Second power source negative electrode line
CA First winding set
CB Second winding set
HA First GND harness
HB Second GND harness
R1A, R1B Resistor
EA, EA1, EA2 Output voltage of first current detection circuit
EB, EB1, EB2 Output voltage of second current detection circuit
Δ(t) Transitional rise temperature

The invention claimed is:

1. An electronic control device comprising:
a first positive electrode connector and a first negative electrode connector connected to a first power source;
a second positive electrode connector and a second negative electrode connector connected to a second power source;
a first inverter connected to the first positive electrode connector and the first negative electrode connector and energizing a first winding set of an electric motor to drive the first winding set of the electric motor;
a second inverter connected to the second positive electrode connector and the second negative electrode connector and energizing a second winding set of the electric motor to drive the second winding set of the electric motor;
a ground portion connected to the first negative electrode connector and the second negative electrode connector;
a sensor portion provided between the first negative electrode connector and the ground portion or between the second negative electrode connector and the ground portion;
a current detection circuit capable of detecting a current flowing between the first negative electrode connector and the second negative electrode connector via the ground portion based on an output signal of the sensor portion; and
a microcomputer including:
a first microcomputer connected to the first positive electrode connector and the first negative electrode connector and controlling an output of the first inverter, and
a second microcomputer connected to the second positive electrode connector and the second negative electrode connector, and controlling an output of the second inverter,
wherein the first microcomputer and the second microcomputer determine whether an abnormality is generated in a resistance value of a first ground harness from the first negative electrode connector to the first power source or a resistance value of a second ground harness from the second negative electrode connector to the second power source based on an output voltage of the current detection circuit;
after it has been determined that the abnormality is generated, the first microcomputer and the second microcomputer start estimating a rise temperature inside the electronic control device based on an output voltage of the current detection circuit; and
the first microcomputer starts restriction of a current output from the first inverter based on the rise temperature, or the second microcomputer starts restriction of a current output from the second inverter based on the rise temperature.

2. The electronic control device according to claim 1, wherein the sensor portion has a first sensor portion and a second sensor portion;
the current detection circuit has a first current detection circuit inputting an output signal of the first sensor portion and a second current detection circuit inputting an output signal of the second sensor portion;
the first sensor portion is provided between the first negative electrode connector and the ground portion;
the second sensor portion is provided between the second negative electrode connector and the ground portion;
an output voltage of the first current detection circuit is input to the first microcomputer; and
an output voltage of the second current detection circuit is input to the second microcomputer.

3. The electronic control device according to claim 2, wherein a rise temperature inside the electronic control device is a rise temperature of the first sensor portion and a rise temperature of the second sensor portion.

4. The electronic control device according to claim 3, wherein restriction of the current output from the first inverter or restriction of the current output from the second inverter is executed when a differential between a first resistance value of the first ground harness and a second resistance value of the second ground harness is not less than a predetermined value.

5. The electronic control device according to claim 4, wherein whether or not the differential is not less than the predetermined value is determined based on a current detected at the first current detection circuit or the second current detection circuit.

6. The electronic control device according to claim 3, wherein, in a case in which abnormality has been generated in the first ground harness, the first microcomputer starts restriction of a current output from the first inverter based on a rise temperature of the first sensor portion, and the second microcomputer increases a current output from the second inverter.

7. The electronic control device according to claim 6, wherein the first microcomputer estimates a rise temperature of the first sensor portion based on an average value of an output voltage of the first current detection circuit since the generation of abnormality in the first ground harness; and
the second microcomputer estimates a rise temperature of the second sensor portion based on an average value of an output voltage of the second current detection circuit since the generation of abnormality in the second ground harness.

8. The electronic control device according to claim 3, wherein the first microcomputer starts restriction of a current output from the first inverter when the rise temperature of the first sensor portion has risen up to a predetermined limit rise temperature which is a rise temperature permissible in terms of a resistance heat cycle performance of the first sensor portion, whereas the second microcomputer starts restriction of a current output from the second inverter when the rise temperature of the second sensor portion has risen up to a predetermined limit rise temperature which is a rise temperature permissible in terms of a resistance heat cycle performance of the second sensor portion.

9. The electronic control device according to claim 3, wherein the first microcomputer starts restriction of a current output from the first inverter when a transitional absolute temperature that is obtained through addition of an atmosphere temperature to the rise temperature of the first sensor portion has risen up to a predetermined limit absolute temperature which is an absolute temperature permissible in terms of a heat resistance performance of the first sensor portion; whereas the second microcomputer starts restriction of a current output from the second inverter when a transitional absolute temperature that is obtained through addition of an atmosphere temperature to the rise temperature of the second sensor portion has risen up to a predetermined limit absolute temperature which is an absolute temperature permissible in terms of a heat resistance performance of the second sensor portion.

10. The electronic control device according to claim 2, wherein separate electrical systems are formed by the first inverter, the first sensor portion, the first current detection circuit, and the first microcomputer, and by the second inverter, the second sensor portion, the second current detection circuit, and the second microcomputer; and the microcomputer can detect abnormality in the first sensor portion and the first current detection circuit or in the second sensor portion and the second current detection circuit based on an output voltage of the first current detection circuit and an output voltage of the second current detection circuit, and when abnormality is detected in the first sensor portion and the first current detection circuit, the first microcomputer of the same electrical system as the first sensor portion and the first current detection circuit estimates the rise temperature based on an output voltage of a current detection circuit different from the first current detection circuit and inputting an output signal of the second sensor portion in which the abnormality has not been detected, or an output voltage of the second current detection circuit.

* * * * *